United States Patent
Ternovskiy et al.

(10) Patent No.: US 10,175,349 B1
(45) Date of Patent: Jan. 8, 2019

(54) DUAL RF AND OPTICAL MODE OMNIDIRECTIONAL SENSOR

(71) Applicant: The United States of America as represented by the Secretary of the Air Force, Washington, DC (US)

(72) Inventors: Igor Ternovskiy, Xenia, OH (US); Tony Kim, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 382 days.

(21) Appl. No.: 14/940,193

(22) Filed: Nov. 13, 2015

Related U.S. Application Data

(60) Provisional application No. 62/082,172, filed on Nov. 20, 2014.

(51) Int. Cl.
   *G01S 13/86* (2006.01)
   *G01S 13/89* (2006.01)

(52) U.S. Cl.
   CPC .......... *G01S 13/865* (2013.01); *G01S 13/89* (2013.01)

(58) Field of Classification Search
   CPC .................................................. G01S 13/865
   USPC ............................................................ 342/54
   See application file for complete search history.

(56) References Cited

U.S. PATENT DOCUMENTS

| | | | |
|---|---|---|---|
| 5,268,680 A * | 12/1993 | Zantos | F41G 7/008 342/53 |
| 5,666,128 A | 9/1997 | Murray et al. | |
| 6,278,480 B1 | 8/2001 | Kurahashi et al. | |
| 6,307,521 B1 * | 10/2001 | Schindler | G01S 13/86 342/53 |
| 6,449,103 B1 | 9/2002 | Charles | |
| 6,987,258 B2 | 1/2006 | Mates | |
| 7,065,465 B2 | 6/2006 | Chen et al. | |
| 7,106,268 B1 | 9/2006 | Angelucci | |
| 7,231,017 B2 | 6/2007 | Gertsenshteyn et al. | |
| 7,376,314 B2 | 5/2008 | Reininger | |
| 7,385,553 B1 | 6/2008 | Garren | |
| 7,515,098 B1 | 4/2009 | Garren et al. | |
| 7,587,109 B1 | 9/2009 | Reininger | |

(Continued)

OTHER PUBLICATIONS

Upadhyay, Infrared Omni-Directional Mirror Based on One-Dimensional Birefringent-Dielectric Photonic Crystal, Progress in Electromagnetics Research, 2012, vol. 25, 211-222.

(Continued)

*Primary Examiner* — Peter M Bythrow
*Assistant Examiner* — Helena H Seraydaryan
(74) *Attorney, Agent, or Firm* — AFMCLO/JAZ; James McBride

(57) ABSTRACT

A multi-modal omnidirectional sensor includes an ovaloid aperture having a plurality of tapered square prismatic cells formed from a plurality of partition walls. A focal ovaloid is concentric with the ovaloid aperture, and the focal ovaloid has an outer surface dimension that coincides with a focal distance of the ovaloid aperture. A multi-mode sensor array is disposed on the focal ovaloid, and is configured to receive an optical signal and a radio frequency (RF) signal. One of the plurality of partition walls comprises a non-metalic dielectric mirror. One of the plurality of partition walls is configured to be reflective to a band of desired wavelengths of the optical signal while being transparent to the RF signal.

12 Claims, 7 Drawing Sheets

(56) References Cited

U.S. PATENT DOCUMENTS

| | | | |
|---|---|---|---|
| 7,974,814 B2 | 6/2011 | Phelps et al. | |
| 9,865,921 B2 * | 1/2018 | Griffith | H01Q 5/22 |
| 2004/0021852 A1 | 2/2004 | DeFlumere | |
| 2007/0025512 A1 * | 2/2007 | Gertsenshteyn | G01N 23/203 |
| | | | 378/86 |
| 2012/0026592 A1 | 2/2012 | Reininger | |
| 2012/0119943 A1 | 5/2012 | Bergeron et al. | |
| 2012/0229355 A1 | 9/2012 | Scolamiero et al. | |
| 2013/0216124 A1 | 8/2013 | Shroff et al. | |
| 2015/0323287 A1 * | 11/2015 | Durand | F41G 7/26 |
| | | | 244/3.16 |

OTHER PUBLICATIONS

Huang, Large-Field-of-View Wide-Spectrum Artificial Reflecting Superposition Compound Eyes, Small—Journal of Nanotechnology, Aug. 13, 2014, vol. 10 No. 15.

* cited by examiner

DUAL RF AND OPTICAL MODE OMNIDIRECTIONAL SENSOR

Pursuant to 37 C.F.R. 1.78(a)(4), this application claims the benefit of and priority to prior filed co-pending Provisional Application Ser. No. 62/082,172, filed 20 Nov. 2015, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to radio frequency and optical / infrared sensors and, more particularly, to sensors with large apertures using the reflective properties of engineered layered dielectric materials.

BACKGROUND OF THE INVENTION

Sensing systems often benefit from the fusion of dissimilar signal types and there are numerous advantages to integrating different modality measurements, such as radio frequency and optical/infrared, into one platform. The information derived from such measurements is complimentary and may provide advantages under certain operating conditions. Radars, in the basic forms, are used for ranging and Doppler shift detection. Synthetic Aperture Radar additionally allows a system to generate an image based on the synthetic aperture resulting from the motion of the sensor or an object. Radars can provide high precision distance and velocity measurements suitable for automatic target tracking, while optical or infrared sensors provide superior results with respect to angular resolution of the signal. Also, radars receive much stronger returns from metal and other conductive objects, such as cables and equipment chassis, and could provide views that penetrate underground and through canopies. Likewise, the optical and infrared data has the benefit of being relatively simple to interpret.

Some targets that are designed to channel away RF radiation via geometry and stealth skin material may be more easily detected in the optical/infrared (O/IR) image than by using a radar based system. O/IR images are easier to decipher in high RF saturated environments, and it usually provides much more precise angular resolution in cluttered or dense urban environments. Also, in the absence of supplemental data, jamming and spoofing activity could substantially reduce the reliability of the RF based systems. In many cases, the RF works better for detection, while O/IR signature works better for recognition. It is also noteworthy that O/IR information will be less effective when subjected to high water vapor content in the atmosphere or other environmental conditions.

Many difficulties related to RF information collection in a high clutter environment are caused by multiple RF sources or/and multi-path scattering. The present challenges in spectrum allocations for active radar systems, and sensitivity limitations of passive RF systems, could substantially limit the reliability of the RF data. Stealth targets produce much lower return due to "skin" material design, while some radar targets are designed to channel the RF scattering away from the receiver or to generate decoy signals. For example, a missile or an aircraft could release a decoy cloud. In the presence of countermeasures, radar could lock onto the elements in the decoy cloud or the target. Ideally however, a sensor should discriminate between the target and decoys by using complimentary information that is coming from different modalities.

In most cases, measurements in different modalities from discrete, spatially separated sensors substantially increase the complexity of the information exchange while producing more data for human analysis. By way of example, collecting separate data tracks increases the complexity of the decision system. There are other numerous advantages of collocated multi-modal sensors including elimination of the registration procedure, or alignment to a common datum, for the multimodal data.

In order to direct and concentrate RF electromagnetic energy to detectors, various antennas (horns, resonators, etc.) are used. To concentrate the optical or IR energy on detectors, lenses, curvilinear mirrors, etc. are used. In many cases, the materials used for each such purposes have completely different effects when subjected to other part of the spectrum. For example, metal or magnetic material based antennas are usually attenuate or obscure the optics/IR signal. Conversely, many optical/IR concentrators are made from bulk dielectric materials that affect propagation of RF waves and change their properties with variations of wavelength. In many cases the optical components must be rotated toward the direction of interest using gimbal that is further complicate RF propagation patterns. Additionally, dielectric materials that are in use for optical and infrared sensors also could undesirably affect the RF phased array performance. The integration with antennas in radio wave ranges is often complicated due to requirements to generate a radiation pattern having a footprint in an order of magnitude of at least a quarter of the operative wavelength. For many applications, that could be many orders of magnitude larger than optical/RF waves.

According to the superposition principle, electromagnetic fields in free space result from the vector sum of the individual components. For this purpose, the combination of different modalities could be implemented by materials with the same values of propagation parameters for different wavelengths or using only reflective systems which allow formation of the image for any wavelength in free space without distortions and chromatic aberrations. Unfortunately, a reflection-based omnidirectional focusing apparatus configured to receive wide multi-mode (or multi-physics) signals is not known to the prior art. As a result, there exists a need for an omnidirectional dual RF and Optical sensor implemented as a reflective focusing aperture.

SUMMARY OF THE INVENTION

The present invention overcomes the foregoing problems and other shortcomings, drawbacks, and challenges of utilizing discrete lens or metal based mirrors in sensors. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a multi-modal omnidirectional sensor is provided. The sensor includes an ovaloid aperture having a plurality of tapered square prismatic cells formed from a plurality of partition walls. A focal ovaloid is concentric with the ovaloid aperture and the focal ovaloid has an outer surface dimension that coincides with a focal distance of the ovaloid aperture. A multi-mode sensor array is disposed on the focal ovaloid, and it is configured to receive an optical signal and a radio frequency (RF) signal. The plurality of partition walls are configured to be reflective to a band of desired wavelengths of the optical signal while being transparent to the RF signal.

According to another embodiment of the disclosed invention, A multi-modal omnidirectional sensor is provided. The sensor includes an ovaloid aperture having a plurality of tapered square prismatic cells formed from a plurality of partition walls. A focal ovaloid is concentric with the ovaloid aperture, and the focal ovaloid has an outer surface dimension that coincides with a focal distance of the ovaloid aperture. A multi-mode sensor array is disposed on the focal ovaloid, and is configured to receive an optical signal and a radio frequency (RF) signal. One of the plurality of partition walls comprises a non-metalic dielectric mirror. One of the plurality of partition walls is configured to be reflective to a band of desired wavelengths of the optical signal while being transparent to the RF signal.

In another embodiment of the disclosed invention, a two dimensional multi-modal sensor is provide. The sensor includes a two dimensional aperture formed from a row of tapered square prismatic cells having vertical cell walls and horizontal cell walls. A focal surface is concentric with the two dimensional aperture, and the focal surface has an outer surface dimension that coincides with a focal distance of the two dimensional aperture. A multi-mode sensor array is disposed on the focal surface, and is configured to receive an optical signal and a radio frequency (RF) signal. One of the plurality of partition walls comprises a non-metallic dielectric mirror. Only the horizontal or only the vertical cell walls are reflective to a band of desired wavelengths of the optical signal, and both the horizontal and the vertical cell walls are transparent to the RF signal.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
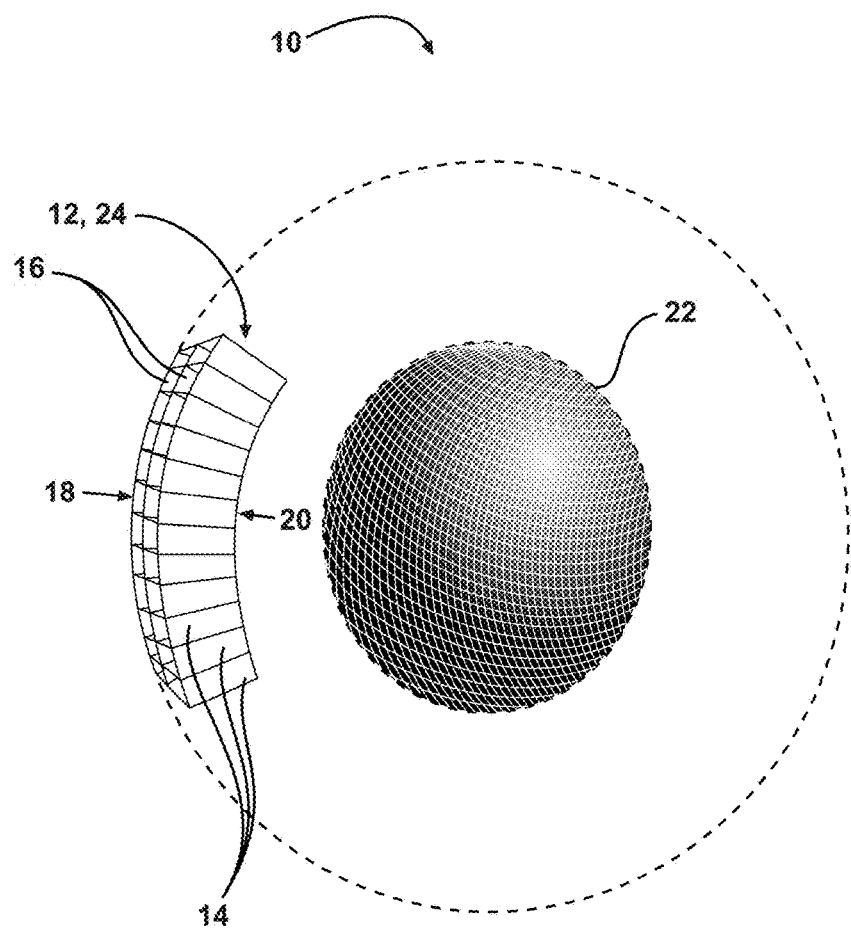
FIG. 1 is a partial cross sectional perspective view of a sensor according to an embodiment of the disclosed invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The disclosed invention may be implemented as an inexpensive omnidirectional multimodal sensor system that uses lobster-eye facts or reflection-type focusing in conjunction with RF/Optical/IR integrated apertures and collocated optical and RF axes. The approach is based on a multi-scale (optics/antennas/detectors/algorithms) design to improve overall system performance using dielectric omnidirectional thin film mirrors. In some embodiments the film and sensor need not be omnidirectional, but should satisfy design requirements related to the desired viewing or signature capture angle, as well as resolution and signal gathering performance specifications. The disclosed invention may also be combined with RF phased arrays both active and passive and active optical (LIDAR). The resulting sensor enables using maximal available and overlapped aperture for RF phased array structures and an O/IR reflection "lobster-eye" based design. In embodiments of the disclosed invention explored below, the RF phased array dielectric waveguides or partition walls may incorporate theoretically lossless multilayered omnidirectional dielectric reflective materials to concentrate and focus the beam without chromatic aberrations and without the additional weight associated with lenses. This reduces RF/O/IR losses, reduces weight, and improves wavelength or band agility.

The disclosed invention may operate in virtually any direction (quasi-omnidirectional) simultaneously and independently multispectral for both RF and O/IR/LIDAR subsystems. In some embodiments, the structure of the mirror may be designed to collect more signal for the selected band, thus resulting in amplifying, or conversely, attenuate a selected spectral component in spectral signature of an object of interest or background/clutter. As a result, an omnidirectional multimodal sensor with large overlapped multispectral aperture configured to detect and identify multiple targets with desired spectral signatures from all direction may be obtained. In addition to the omnidirectionality, the disclosed invention may demonstrate improves target acquisition and tracking over various phases of an encounter (exploiting the RF characteristics at greater distances while utilizing the precision and angular resolution and target signature specific spectrum of O/IR for close-in maneuvering and identification roles).

The disclosed antenna/mirrors design may require and may exploit substantial changes in traditional functions and design of both detectors and processing algorithms. For example, post processing of image data may be accomplished in the digital domain to correct for properties within the image collection sensor system. The detector components may be positioned in small ball (corresponding to the focal plane of the sensor as described below) inside of the "lobster-eye" portion of the sensor. Also "lobster-eye" optics may include plenoptic processing (or post image capture manipulation). For example, with necessitating the use of microlenses, or other interstitial structure disposed between the target and the focal surface 22, the sensor 10 may ascertain the distance of a source by evaluating the point spread function resulting from a target. It should be noted that the geometry of the focal surface may be modified to meet design objective, and may be a focal sphere, focal ovaloid, or focal plane in some embodiments.

All components of the disclosed multimodal sensor 10 detectors may be implemented in a single integrated tile with mixed optical and electronic processing. Using optical processing of the RF signal may further improve precision, performance, and reduce size, weight, power consumption, and vulnerability to countermeasures and EM discharge. In the past, large-scale integration of electronic component into integrated circuits had revolutionary effect on electronics development and systems cost. The versatile and widespread applications of the optoelectronics to phased array RF systems were currently delayed due to comparably higher cost and lesser dynamic range of optical components. The disclosed invention may include photonic integrated circuits that enable putting lasers, couplers, modulators, and detectors on the same integrated component, some of which may even be on the same die of an integrated circuit, thus reducing optical losses and opening up an opportunity to drastically reduce cost, size, weight, and optical system design complexity.

As defined herein "optical" shall mean wavelengths that who's behavior may be described predominantly in terms of rays with respect to the scale of a device. Conversely, "RF" or "Radio Frequency" shall refer to wavelengths wherein its behavior may be predominantly described in terms of wave equations or Maxwell equations.

FIG. 1 illustrates an embodiment of the disclosed omnidirectional multi-modal sensor 10. As will be used in the discussions herein, multi-modal shall include both signals of varying bands and signals having disparate reception characteristics. For example, the term multi-modal may facilitate comparison of various wavelengths within the visible or invisible spectrum. Additionally, the term may be used to distinguish between apparatus required for the acquisition of an Ultra High Frequency signal versus far infrared. Likewise, the term "omnidirectional" shall relate to configurations designed to have a low degree of directional sensitivity. Apparatus may have "blind spots" or some degree of asymmetric attenuation, yet still be deemed omnidirectional.

The sensor 10 includes a waffle grid 12 that includes a plurality of partition walls 14 forming a repeating pattern of substantially identical tapering square prisms for one type of signal or spectral band interval. Each set of four partition walls 14 forms a cell 16 having its greatest cross sectional area at a first end 18 and its smallest cross section area at a second end 20. The assembled collection of first ends forms a spherical aperture 24 having a radius r. The sensor 10 may include partition walls 14 having variable pitch (spacing between partition walls 14) to tune the sensor 10 to a wavelength interval of interest. For example, some regions of the sensor 10 may include partition walls 14 spaced one unit apart from each other, while a series of adjacent partition walls 14 may be spaced 2 units apart from each other. Partition walls 14b are depicted has having a pitch (spacing), approximately twice that of partition walls 14. Further, a set of partition walls 14 having a first pitch, may be nested within a set of partition walls 14 having a second pitch (yet both sets will share a focal surface 22 as will be described in detail below, as well as share a common geometric center), so as to be tuned to two or more wavelengths of interest.

In addition, as will be descried in detail with respect to FIG. 2 below, the partition walls 14 may be fabricated from a plurality of dielectric mirror surfaces, stacked on top of each other, to provide enhanced sensitivity to desired wavelength intervals. Partiton walls 14 are shown with stacked (a space is included in the figures for the sake of clarity) next to second layer 14a. For example, a first dielectric mirror surface may be substantially reflective to near infrared (0.8 to 1.2 micron) and transparent to wavelengths outside of that range. A second exemplary dielectric mirror layer, stacked thereon, may be substantially reflective to Mid Wavelength Infrared (4 to 5 micron) and transparent to wavelengths outside of that range. In this way, a composite sensitivity, equal to the sum of the layer's reflective ranges, may be realized by the sensor 10. Such layering will yield a multi-spectral sensor 10 tuned to a desired multi-spectral signature of a target of interest.

In some embodiments, the assembled collection of first ends 18 forms a distorted sphere as depicted in FIG. 1 or ovaloid. A "distorted sphere" is coined to differentiate that an ideal sphere is a set of points equidistant from a given point, whereas the collection of first ends 18 is a collection of flat facets, that, with increasing number, approaches a spherical shape. An ovaloid shall be defined a type of distorted sphere, wherein a distorted sphere has a single center and single focus, while an ovaloid may have a plurality of foci and radii. An ovaloid, by way of example and not limitation, may be egg-shapped, oblate ellipsoid, prolate ellipsoid, scalene ellipsoid, or the like. In other embodiments, the assembled collections of first ends 18 form an ovaloid figure (with the geometries of related components adjusted to comport with the ovaloid figure). While a spherical structure may provide advantages in certain applications and would have no distortions caused by changes of angle of view, an ovaloid structure may be configured to fit with the geometry of a given enclosure, (by way of example, a radome, missile seeker head, etc.). A focal surface 22, may be concentric with the spherical aperture 24 formed by the totality of the waffle grid 12. In some embodiments the spherical aperture 24 has a radius of r/2. The radius of r/2 coincides with the focal distance of electromagnetic energy focused by the spherical aperture 24 for the plane wave or the source at infinity. It should be noted that the focal surface 22 may be modified into an ovaloid or other configuration to cooperate with assembled waffle grids 12 having an ovaloid profile. While only a portion of the waffle grid 12 has been illustrated in detail for clarity, substantially all of the spherical aperture 24 may be fashioned of cells 16. Certain areas of the surface of the spherical aperture 24 may be reserved for mounting hardware or to facilitate passage of conductors or other structures through the thickness of the spherical aperture 24.

While the bulk of the discussion that follows will be directed to a three dimensional sensor 10, a two dimensional embodiment may be achieved by utilizing only parallel partition wall 14 faces for reflection of an optical signal. For example if vertical partition walls 14 are configured to be reflective to an optical band of interest, the horizontal partition walls, (if any) will serve primarily as spacers or stiffeners to maintain the vertical walls' orientation. The focal surface 22 may be modified to accommodate the focal distance of the two dimensional aperture formed by the vertical reflective partition walls 14. By way of example, the focal surface may take the form of a strip having a height at least equal to the height of the vertical partition walls 22, wherein the strip is bowed or arched to conform th the focal distance of the collection of vertical partition walls.

Figure 2:
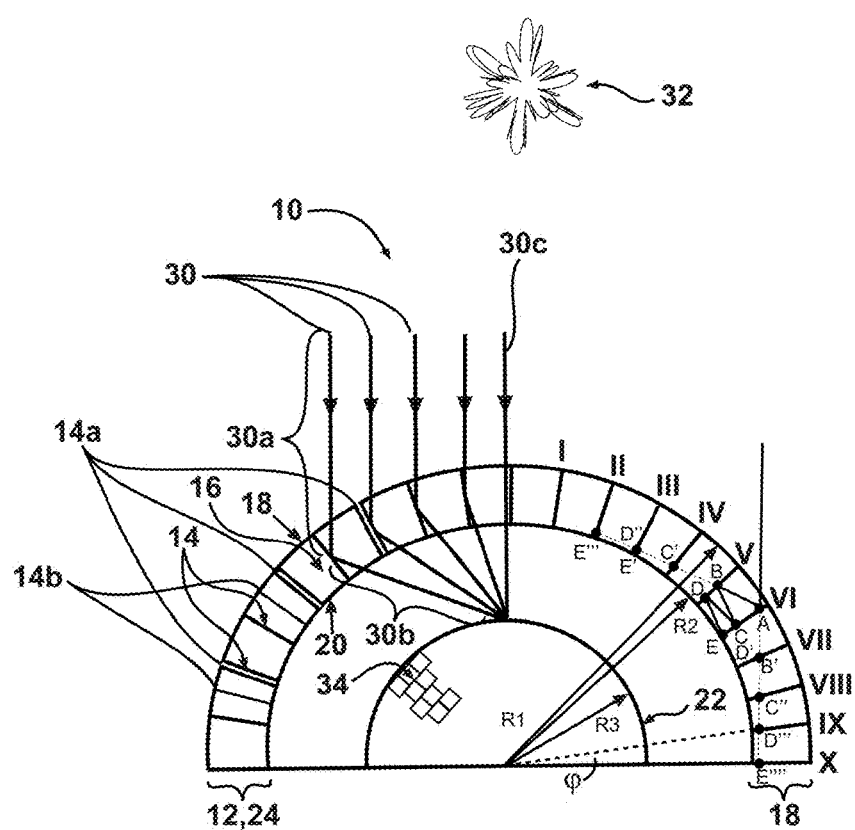
FIG. 2 is a cross sectional view, taken at the centerline of a sphere according to an embodiment of the disclosed invention.

Turning attention to FIG. 2, a cross sectional view of an embodiment of the sensor 10 is shown. Signal rays 30, originating from a distant target 32 enter the cells 16. As the incident rays 30*a* strike the partition walls 14, reflective rays 30*b*, converge onto the focal surface 22. It should be noted that some rays 30, for example 30*c*, may pass through the cell 16 without encountering a partition wall 14. In some instances, it could result in multiple reflection in the same cell 16. It is noted that this configuration yields a performance benefit absent from many refractive-type focusing apparatus; namely, that there is substantially no back-reflection of light that enters the spherical aperture 24. This is desirable in certain circumstances to conceal the existence of the sensor 10.

The partition wall 14 may be constructed of a material designed to be reflective to the type of signal to be sensed. To enable use of the sensor 10 in environments in which the particular modality of an incoming signal is unknown, or where a plurality of modalities must be simultaneously sensed, the partition wall 14 must be constructed of a material that facilitates the reflection of each type of modality. An example is layered media with repetitive pattern of 2 types of layers with different refractive index. Such structure comprised of more than 10 pairs of layer 1 and layer 2 could be used to design desired reflective spectrum using different indexes and thickness for layer 1 and layer 2.

In some embodiments, a photonic crystal may provide acceptable performance for multi-mode reception while providing an effective means to reflect electromagnetic radiation due to its properties of a photonic band gap. An omnidirectional mirror may be achieved using a one dimensional photonic crystal fabricated into the structure of the partition walls 14 and resulting cells 16. Such dielectric mirrors have the ability to almost completely reflect the radiation in a particular range of frequencies for all possible angles of incidence and for both of polarizations. Si in combination with $SiO_2$ may produce satisfactory omnidirectional dielectric mirrors along with other materials. In some embodiments of the disclosed invention, the omnidirectional reflecting photonic structure of the cells 16 has been designed with a wide refection range in the mid infrared region. Such films have no metal content and are not conductive. As a result, RF will not generate currents in it that may substantially affect the RF fields. Also, since it is constructed of a dielectric material, it has a permittivity and/or permeability different from air or a vacuum. The thickness of the film may be a fraction of the RF wavelength, so RF losses are often negligible.

In other embodiments of the disclosed invention, a laminated polymer dielectric sheet may be used. In such embodiments, the photonic structure, a periodic multi-layered stack, may consist of eight sub-layers of birefringent and dielectric materials. For the purposes of this discussion, optical birefringence may be used to describe the difference of a material's refractive indices with direction and with the state of polarization. Some embodiments may include potassium titanyl phosphate (KTP) and lead sulfide (PbS) layers in an alternating configuration. The thickness of the birefringent layer may be 470 nm and the PbS layer may be 290 nm. It is noted that other suitable materials and dimensions may yield acceptable results to accomplish varied design objectives. Some traditional polymer materials with different indexes produce desired effects too. For example, Cool Mirror 330 film manufactured by the (3M) corporation has shown to produce acceptable results. Other compositions having additional layers of dissimilar indices of reflection may be assembled to yield optical properties that accomplish design objections. The dielectric mirror films designed for one spectral interval could be transparent or have low losses in another spectral interval, thus allowing combinations of different types of materials in one mirror film with combined reflective properties.

Once appropriate reflective properties of the partition walls 14 have been achieved, the focal surface 22 may be configured with a detector array 34. The detector array 34 may be a repeating pattern of detectors calibrated to sense the range of expected signals. Cabling, support, and interconnections to the detector array 34 may pass through one or more of the cells 16 and terminate at instrumentation external to the sensor 10.

Figure 3:
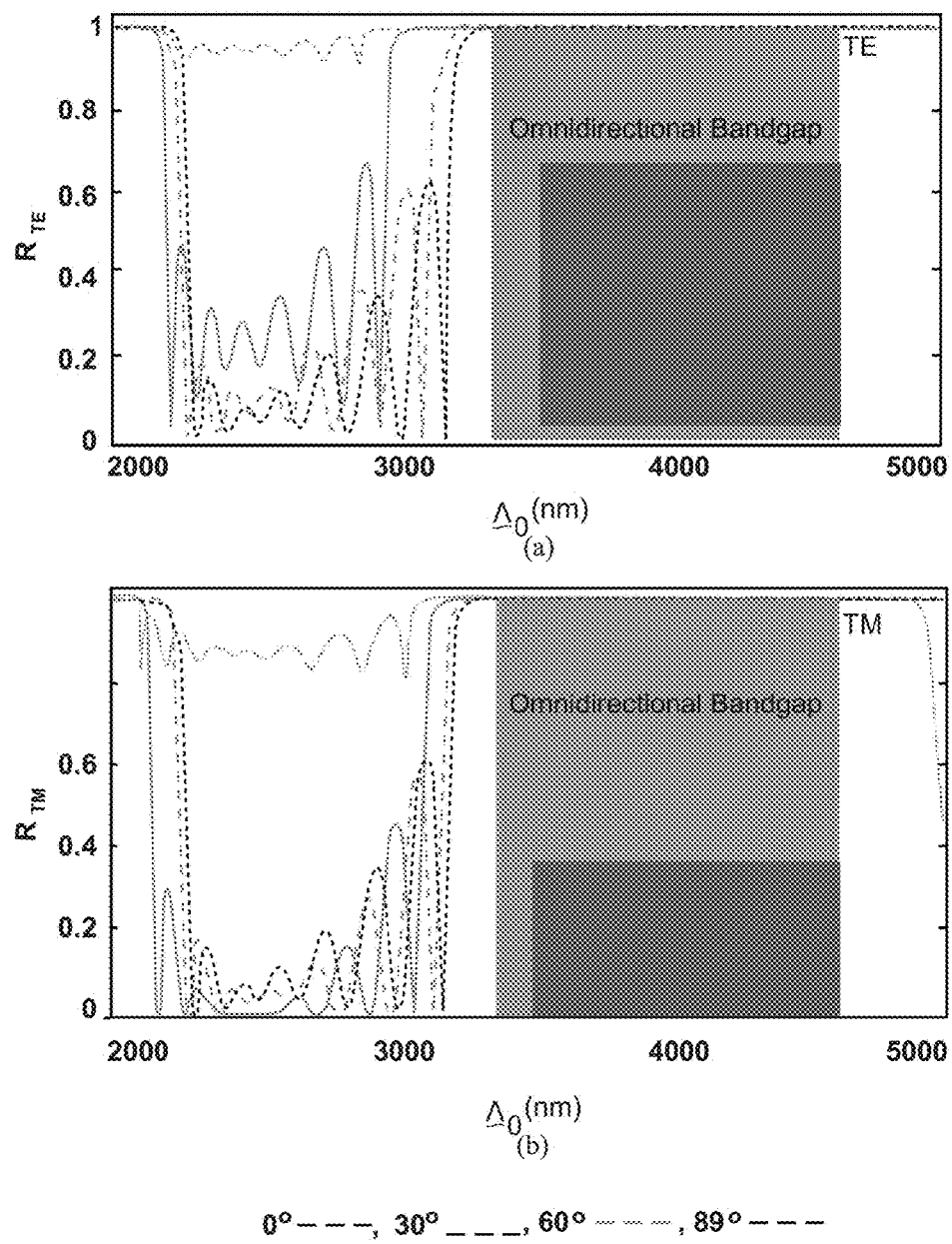
FIG. 3 is a graphical representation of performance results of thin film dielectric mirror used in embodiments of the disclosed invention.
Figure 4:
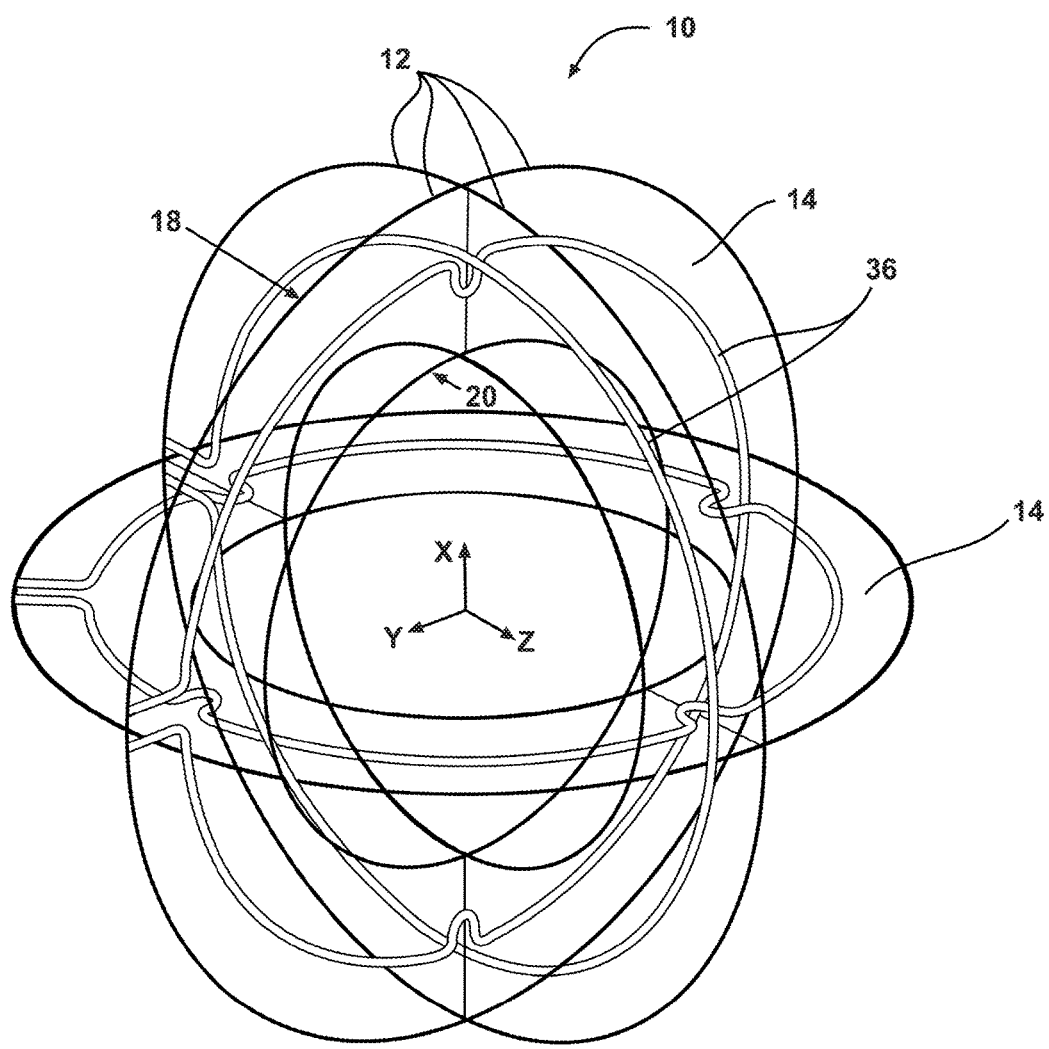
FIG. 4 is a view of an embodiment of disclosed invention incorporating metallic antenna conductors into the structure of the sensor.

FIG. 3 represents TE (a) and TM (b) polarizations versus wavelength for different incident angles. The gray area indicates total omnidirectional reflectance area for an exemplary test of 3M Cool Mirror 330. It should be noted that such reflective surfaces will work only for one of the signals (optical) and only for the spectral band that is defined by reflectivity of the film. However, it is noted that the RF signal will be passing through the cell 16 surfaces and partition walls 14 without attenuation (or with very small attenuation). To collect longer wave signals (in embodiments configured for RF reception) it is not necessary to have a completely reflective cell 16. For some RF reception scenarios, the sensor 10 could have antennas embedded directly in the reflective cells 16. In some embodiments of the disclosed invention, dipole or other line-type antenna structures may be incorporated into the waffle grid 12. For example, a plurality of metallic traces may be disposed along the perimeter of the waffle grid 12 along orthogonal planes. By way of example, FIG. 4 depicts a configuration that yields acceptable results for directional location of RF signals. The metallic traces may be disposed on a portion of the waffle grid 12 by metallic vapor deposition, cooper-type tape, or by other means known to one of ordinary skill in the art. By way of example, the following deposition recipe has been shown to yield acceptable results. Also, antenna elements could be embedded into the partition walls 14 of the waffle grid 12. Such antenna elements could include arrays or single dipoles, patch antennas, micro-strip antennas, or various reflective antenna elements. The antenna feed could be optimally arranged along the radii of the sensor 10 bringing the signal below the detector surface to avoid interference with shorter wavelength signals.

Figure 5A:
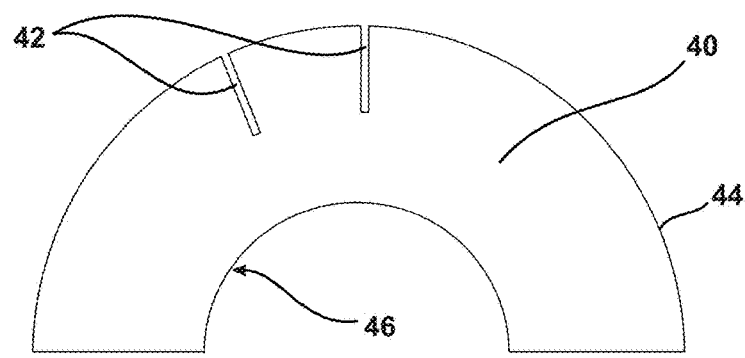
FIGS. 5A-5C illustrate arcuate segments that may form structures according to embodiments of the disclosed invention.
Figure 5B:
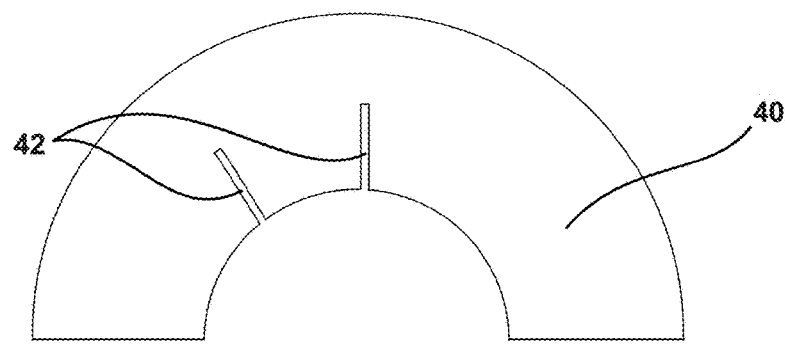
Figure 5C:
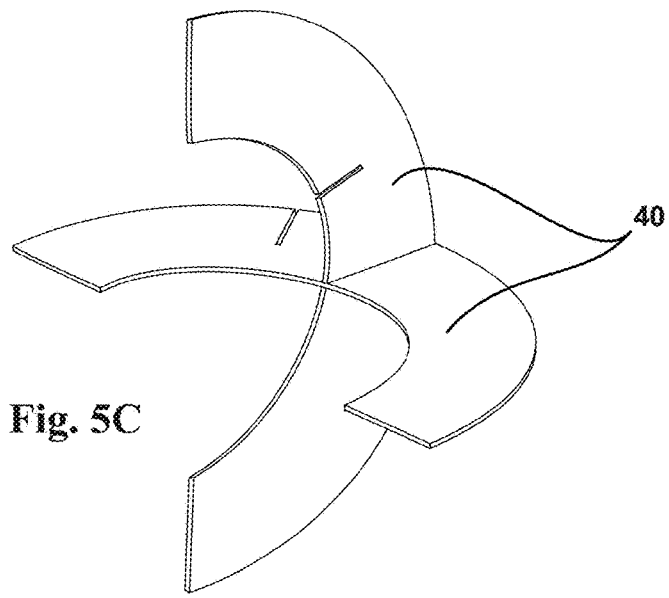

Turning attention to FIGS. 5*a*-4*c*, in some embodiments of the disclosed invention, the waffle grid 12 may be fabricated by taking a plurality of arcuate segments 40, and subsequently cutting a plurality of half lap joint slits 42 therein. On some arcuate segments 40, the half lap joint slits 42 are applied to the convex surface 44 of the arcuate segment 40 (FIG. 5*a*), while others are applied to the concave surface 46 of the arcuate segments 40 (FIG. 5*b*). FIGS. 4*a* and 4*b* depict two cooperating arcuate segments 40 prior to assembly, and FIG. 5*c* shows them in a mated state. It will be recognized by one of ordinary skill in the art, that while the half lap joint slits 42 have been depicted at having an equal depth, it may be acceptable to make all slits, by way of example and not limitation, 33/64 of the way through the arcuate segments 40 (to allow clearance for manipulation). Further, the division of the slits may be divided asymmetrically with a ¼ depth slit on one arcuate segment 40 and ¾ depth slit on a mating arcuate segment 40 (for example, to dissuade incorrect assembly).

In further embodiments, some of the arcuate segments 40 could be substituted for ring segments having an inner radius corresponding to the second end 20 and an outer radius corresponding to the first end 18, of the waffle grid 12. The collection of ring segments would be substantially planer near the equator of the focal surface 22, but would be necessarily transformed into a frustoconical geometry as the ring segments approach the poles (to maintain the proportions of the cells 16). In other embodiments, a plurality of planer ring segments, dimensioned as noted above, may be rotated through a first axis (yielding a plurality of meridians) and thereafter rotating a second set of planar ring segments, dimensioned as noted above, orthogonal to the first set of planar rings (and may incorporate half lap joint slits 42 for joining them). This will yield a waffle grid 12 having to axes, four poles, and smaller cells 16 at the poles. The smaller cells 16 at the poles may be extracted and replaced with a subsphere having larger cell 16 dimensions.

Some embodiments may be fabricated by forming two hemispherical (or some other fractional sphere or subsphere) waffle grid 12, and thereafter joining them with adhesives, ultrasonic welding, mechanical fasteners, or other methods known to one of ordinary skill in the art. Additional embodiments may be fabricated from a folded or origami structure by cutting and folding the film. Such configurations may be folded into a quasi-planer, or reduced volume, geometry when not in use, and unfolded into an expanded geometry during use.

Figure 6A:
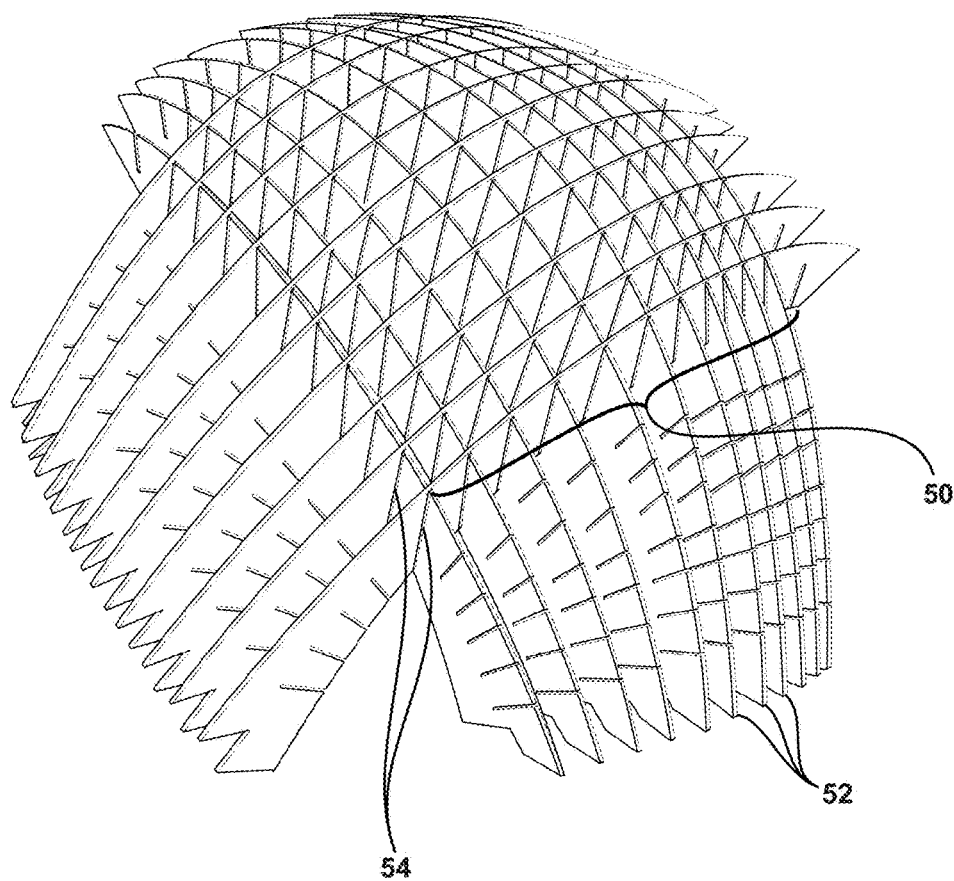
FIG. 6A and 6B illustrate one of the embodiments of the invention including thin film mirrors configured for folding.
Figure 6B:
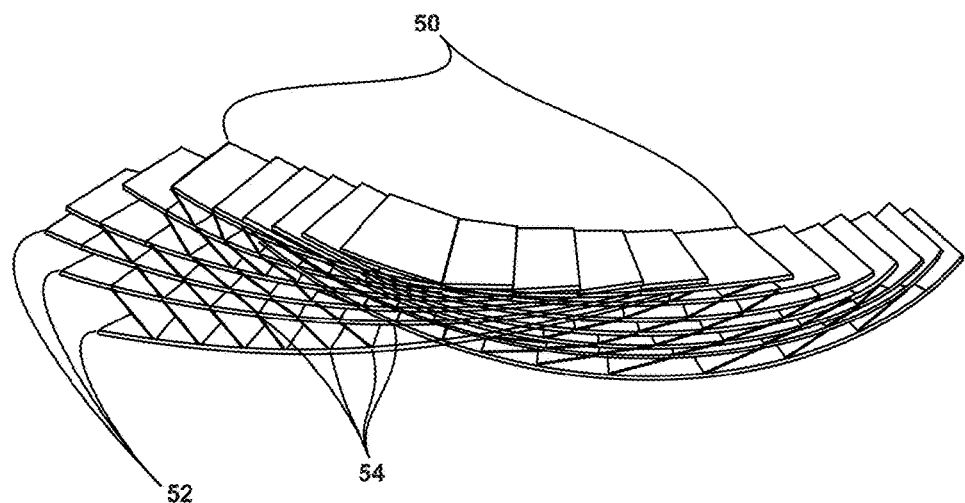

An example of one such folding geometry is depicted in FIG. 6A and 6B. A subsphere 50 may be fabricated having a plurality of origami plates 52 joined at hinged intersections 54. As defined herein, a sub-ovoid is analogous to a sub sphere, in that it is a fractional portion of an ovoid. In some embodiments the subsphere 50 may comprise a 45 degree wedge of a sphere. In some embodiments, the hinged intersections 54 may be accomplished by use of the half lap joint slits 42 noted above. In other embodiments, ultrasonic welding, flexible adhesives, or other bonding known to one of ordinary skill in the art may be used to fabricate a living hinge. As the subsphere 50 angle increases, twisting forces occur at the hinged intersections during a folding operation. Larger degree subsphere 50 wedges may be achieved by using origami plates 52 having greater flexibility, or by using hinged intersections 54 having a greater degree of motion freedom. FIG. 6B illustrates that subsphere 50 in a folded or flattened configuration.

The dimensions of the sensor 10 may be optimized using the following considerations. Turning attention to FIG. 2 again, one may use 4 parameters to define the characteristics of the focusing system. For example, an outer mirror radius R1 defining the distance from the center to the first end 18, an inner mirrors radius R2 defining the distance from the center to the second end 20, and the detector radius R3 defining the distance from the center to the focal surface 22. The fourth parameter is the angle between the mirrors ω (spacing or pitch).

Using the law of reflection (Fermat principle) for a plane mirror where the image distance behind the mirror is the same as the object distance in front of the mirror, the 3D system could be built by using similar a rotation along the normal axis or meridian and the attitude of the system.

It has been demonstrated that scattering points and corresponding reflected beams could be built using straight line and reflections from the mirrors. The reflected beam could be built by using reflecting in the corresponding mirror segments. An initial vertical beam of light hits mirror VI at point A. The reflected beam would hit mirror V at point B (second reflection point), the image of which is B' and symmetrical to B in mirror VI. Then, the beam is reflected in point B and hits mirror VI at point C. The image C in the mirror V is C'. C' is reflected in mirror VI and its image is C''. It is positioned on the continuation of the initial straight beam. By using sequences of reflections in mirrors V and VI, one could show that all reflection points actually are located on crossing of the initial beam continuation (vertical dotted line) and corresponding mirrors, because each mirror reflects other mirrors in each other. For example, mirror VI reflects mirror V to VII. Image D''' is located on mirror IX and E'''' is located on mirror X. With this example, one could determine an effective aperture for the light that could come inside the device using multiple reflections that corresponds to R2. The reflection in point D is the fourth reflection of the beam. The fifth reflection with image E'''' at mirror X happens at the normal angle. This means that minimal light from point E is sent back along its initial path to outside to the source. The beams that are closer to center of the device will come inside of the device. The beams that are further away will be scattered outside the device.

Again, using the distance of the starting point of the beam from the center of the device d, one could analyze the amount of light that could be collected by the device. The incoming light could be divided on orders in accordance with light is divided on $$I = I_0 + I_1 + I_2 + I_3 + \cdots + I_{losses}$$

The indices correspond to the number of reflections that beam will have inside the cell before coming inside the device. $I_{losses}$ represents losses from scattering direct light to the detector or the 0-order light $I_0$ calculated over the linear size of the device along x-axis restricted by $0 < d < R2*\cos(\varphi)$ and further from $R1*\cos(1*\varphi) < d < R2\cos(1*\varphi + \varphi)$. For the arbitrary mirror n, the interval will be $$d \subset [R1\cos\alpha, R2\cos(a+\varphi)],$$

where $$\alpha = n*\varphi + \Psi, n—$$

is number of the mirror blade, and

Ψ—is the phase (rotation of the device around z—axis that is smaller than φ). Using mirror reflection principles, one can determine symmetric beams along the mirror position on the detector. Using mirror III and IV reflections one could determine the position of the image symmetric along the mirror I position on the detector. In the case of mirror III, one also sees the detectors aperture radius for one scattering that corresponds to R3. The 1-order light is restricted to d from R2*cos(a) to min of ((R1*cos (α+φ) or R2cos (α+φ)), where α=n*φ+Ψ. The 1-order beam will hit the detector (with radius R3) only with coordinates less than R3. It is clear that odd scattered hit detector on the opposite side of the device. The order 0 and order 1 light is shown with detector limit for orders 0 and 1.

The disclosed invention may be configured as both a receiver and a transmitter a signal for both RF and optical /IR signals. The optical active mode could be implemented using LIDAR principles. A laser located at or near the focal surface 22 produces a narrow field of view signal along the radius. As such, the signal may be aimed to pass through the cell 16 of the waffle grid 12 without touching the partition walls 14. The returning signal is wider and will cover entire spherical aperture 24 of the device. The collected light will be reflected toward and around the laser's origin. To steer the beam, one may use multiple fiber waveguides or micromirrors to deliver the laser beam toward the focal surface 22 and sent from the device along the radius of this point in the desired direction. Also, the laser could be placed in the central point of the spherical aperture 24 and be configured to rotate toward a desired direction.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A multi-modal omnidirectional sensor, the sensor comprising:
   an ovaloid aperture having a plurality of tapered square prismatic cells formed from a plurality of partition walls;
   a focal ovaloid concentric with the ovaloid aperture, wherein the focal ovaloid has an outer surface dimension that coincides with a focal distance of the ovaloid aperture;
   a multi-mode sensor array disposed on the focal ovaloid, and configured to receive an optical signal and a radio frequency (RF) signal; and
   wherein the plurality of partition walls are configured to be reflective to a band of desired wavelengths of the optical signal while being transparent to the RF signal.

2. The sensor of claim 1, wherein the ovaloid aperture is spherical and wherein the focal ovaloid is spherical.

3. The sensor of claim 1, wherein the ovaloid aperture and focal ovaloid are configured such that a light source directed into the ovaloid aperture yields substantially no light reflected out of the ovaloid aperture.

4. The sensor of claim 1, wherein the partition walls include a first layer configured to be reflective to a first spectral interval, and further including a second layer configured to be reflective to a second spectral interval, and wherein the combination of the first layer and the second layer yields a reflectivity to a desired composite spectral signature.

5. The sensor of claim 1, wherein the sensor is configured to yield plenoptic imaging without inclusion of microlenses.

6. The sensor of claim 1, further including a conductive antenna configured to capture a desired RF signal.

7. The sensor of claim 6, wherein the conducive antenna is configured to not substantially impact the optical sensing.

8. The sensor of claim 6, wherein the conductive antenna is disposed on one of the partition walls.

9. The sensor of claim 7, wherein the conductive antenna is disposed within a thickness of the partition wall.

10. The sensor of claim 1, wherein the prismatic cells comprise a plurality of sub-ovoid, and wherein each of the sub-spheres may be collapsed to a reduced volume by a shearing.

11. A multi-modal omnidirectional sensor, the sensor comprising:
    an ovaloid aperture having a plurality of tapered square prismatic cells formed from a plurality of partition walls;
    a focal ovaloid concentric with the ovaloid aperture, wherein the focal ovaloid has an outer surface dimension that coincides with a focal distance of the ovaloid aperture;
    a multi-mode sensor array disposed on the focal ovaloid, and configured to receive an optical signal and a radio frequency (RF) signal;
    wherein one of the plurality of partition walls comprises a non-metalic dielectric mirror, and
    wherein the one of the plurality of partition walls is configured to be reflective to a band of desired wavelengths of the optical signal while being transparent to the RF signal.

12. A two dimensional multi-modal sensor, the sensor comprising:
    a two dimensional aperture formed from a row of tapered square prismatic cells having vertical cell walls and horizontal cell walls;
    a focal surface concentric with the two dimensional aperture, wherein the focal surface has an outer surface dimension that coincides with a focal distance of the two dimensional aperture;
    a multi-mode sensor array disposed on the focal surface, and configured to receive an optical signal and a radio frequency (RF) signal;
    wherein one of the plurality of partition walls comprises a non-metallic dielectric mirror;
    wherein only the horizontal or only the vertical cell walls are reflective to a band of desired wavelengths of the optical signal; and
    wherein both the horizontal and the vertical cell walls are transparent to the RF signal.

* * * * *